Nov. 21, 1950 S. T. SEMEGEN 2,530,789
VULCANIZATION OF RUBBER
Filed June 1, 1945
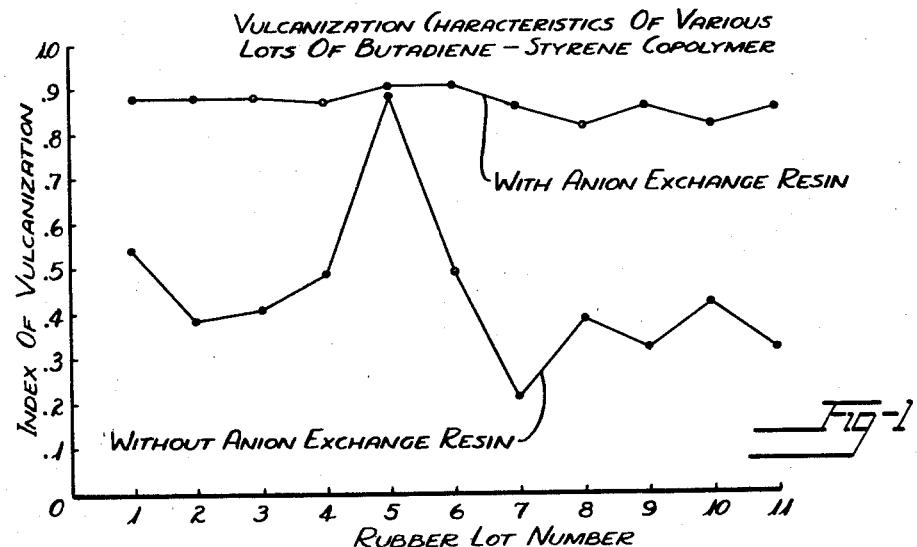
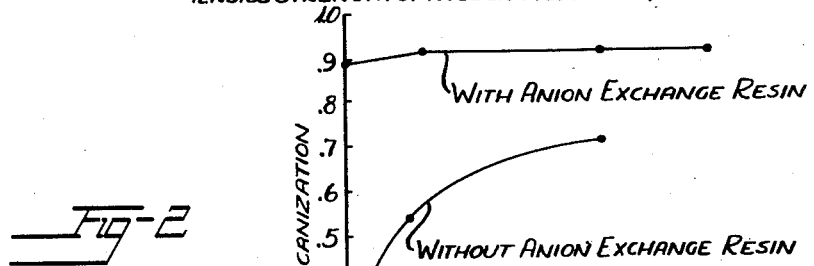
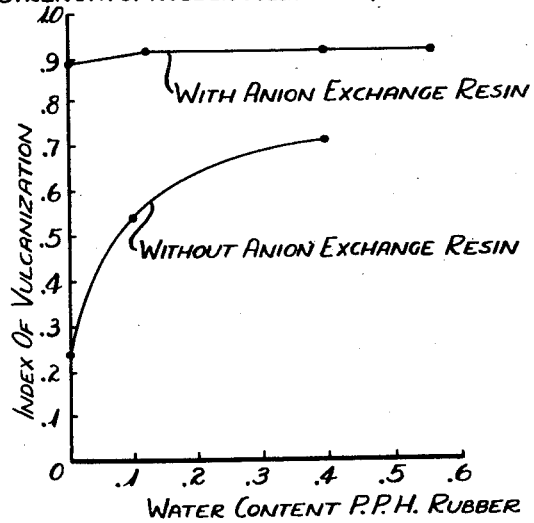
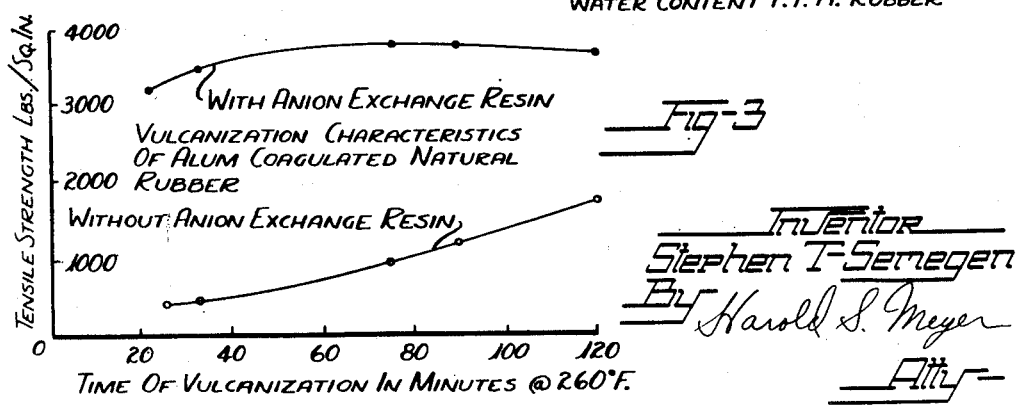

Patented Nov. 21, 1950

2,530,789

UNITED STATES PATENT OFFICE 2,530,789

VULCANIZATION OF RUBBER

Stephen T. Semegen, Akron, Ohio, assignor to The B. F. Goodrich Company, New York, N. Y., a corporation of New York Application June 1, 1945, Serial No. 596,999

4 Claims. (Cl. 260—3)

This invention relates to the vulcanization of a rubber and pertains more specifically to a method of uniformly vulcanizing various lots and types of rubber.

It is well-known that all forms of rubber, both natural and synthetic, exhibit different rates of vulcanization under identical conditions which is a major disadvantage in processing rubber. Under standardized conditions, the times of vulcanization required for various types of rubber to reach the desired optimum physical properties, such as tensile strength, hysteresis, permanent set, etc., vary greatly. This lack of uniformity is also encountered from lot to lot of the same type of crude rubber.

This unevenness in the rate of vulcanization causes serious lack of uniformity in finished products often resulting in considerable rejection and scrapping of the finished goods as well as the production of finished products having properties which are difficult to duplicate. Since it is necessary for the most economical factory operation to establish a standard recipe and vulcanizing procedure, it is, therefore, undesirable to alter the standard procedure every time a new lot of rubber is used even though its rate of vulcanization may be somewhat different from that of the preceding lot.

Attempts have been made to overcome these difficulties by either sorting and storing separately each lot and type of rubber as it is received, or to resort to blending the various lots of the same type of rubber to attempt to minimize the difference between lots. These corrective means not only add unnecessary inconvenience to large scale production of rubber products, but also add considerable expense to the processing and handling costs. The most these methods have ever accomplished is a partial correction and alleviation of the above difficulties.

This variance found in the rate of vulcanization of a rubber is believed to be caused by many factors among which are the variation in the non-rubber constituents, especially the proteins, present in different lots and grades of natural rubbers, the variations in synthetic rubber polymerization, coagulation, etc., and others. Also, the variation in the amount of moisture present in the rubber stocks because of wide differences in drying and humidity of the atmosphere in which these stocks have been stored accounts for some of the differences in the rates of vulcanization from lot to lot. For it is a well-established fact that water greatly accelerates the rate of vulcanization for all rubbers and especially synthetic rubbers. Even small differences in moisture content cause considerable variations in the rates of vulcanization.

I have discovered that the rates of vulcanization of a rubber can be equalized and controlled by incorporating into the rubber an ion-exchange material. These ion-exchange materials are incorporated on a roll mill or in an internal mixer or by any other suitable method, in addition to the usual rubber compounding ingredients, such as any of the ordinary pigments, fillers, dyes, vulcanization accelerators, antioxidants, and the like. These ion-exchange materials are added as finely divided particles of 100 to 325 mesh when hard materials or as granular particles when the materials are thermoplastic. Small quantities of the ion-exchange materials may be used to achieve the desired results. In general 0.1 to 5% or more, based on the rubber composition, can be used.

By incorporating such ion-exchange materials into each lot or grade of rubber, it is possible to obtain the same rates of cure and thus obtain duplication of properties of finished goods. Also, by this invention, variations in water content have very little effect on the rate of vulcanization. Whereas previously 0.1% of water present in the rubber stock is sufficient to double the rate of vulcanization, by the use of an ion-exchange system even as much as 2% or more of water affects the rate of vulcanization very little.

Ion-exchange resins of the organic type are especially effective and preferably the synthetic organic hydrogen cationic type and the base exchange (acid adsorbent) anionic type. These can be used alone or in combination depending on the results desired.

My invention is applicable to all rubbers, natural and synthetic, such as caoutchouc, balata, gutta percha, latex, reclaimed rubber and such synthetic rubbers as can be vulcanized with sulfur, such as polymers of butadiene, isoprene, 2,3-dimethyl butadiene, piperylene, and the like, and copolymers of these compounds copolymerized with acrylonitrile, styrene, methyl acrylate, methyl methacrylate, isobutylene, and other co-polymerizable monomers. These rubbers, which are capable of being vulcanized with sulfur, sulfur bearing compounds such as sulfur donors, and others, are referred to herein, in the specification and claims, as "a rubber".

The synthetic organic ion-exchange resins which are preferred for use according to my invention are the insoluble nitrogenous resinous compositions suitable for anion-exchange, and the insoluble compositions suitable for cation-exchange containing such functional groups as —SO₃H, —CH₂SO₃H, —COOH, —OH, —CH₂OH, and CH₂SH.

Examples of the anion-exchange resins are the meta-phenylene diamine:formaldehyde resin described in U. S. Patent #2,151,883, the polyphenol alkane:formaldehyde:alkylene polyamine resins described in U. S. Patent #2,356,151, the dihydroxy aryl sulfide:formaldehyde:alkylene polyamine resins described in U. S. Patent #2,354,671, and others. The activity of meta-phenylene diamine resins may be increased for my purpose by incorporating into the resin during preparation compounds supplying alkyl groups to form quaternary ammonium bases. Meta-phenylene diamine may also be co-condensed with aliphatic polyamines or polyimines and formaldehyde to give materials of increased activity. The resins may also be modified by treating with cyanamide or dicyandiamide to introduce therein the strongly basic guanidino group, or the aromatic polyamine may be eliminated altogether, and the resins prepared by the condensation of aliphatic polyamines with polyhalogen hydrocarbon derivatives. These resins are described in French Patent #820,969 and British Patent #489,173.

Examples of the cation-exchange resins are the tannin:formaldehyde resins and catechol:formaldehyde resins, resorcinol:formaldehyde resins, pyrogallol:formaldehyde resins, gallic acid:formaldehyde resins, quinol:formaldehyde resins, phloroglucinol:formaldehyde resins, and other mono- and poly-hydroxy phenol:formaldehyde resins as well as dihydroxy napthalene:formaldehyde resins. These cation-exchange resins are thoroughly described in the literature and in such patents as U. S. Patent #2,104,501.

The above anion and cation-exchange resins are referred to in the literature, for convenience, as "synthetic organic ion-exchange resins," and for the same reason will also be referred to herein as "synthetic organic ion-exchange resins."

The preparation of the synthetic organic ion-exchange resins is quite thoroughly covered and described in the patents cited among others. The following are given as examples of the preparation of an anion-exchange resin and a cation-exchange resin.

To prepare an anion-exchange resin of the polyphenol alkane:formaldehyde:alkylene polyamine type, there is stirred together for 15 minutes 57 grams of bis-parahydroxyphenyl dimethyl methane, 8 grams of sodium hydroxide and 150 grams of water. Then 41 grams of a 37% aqueous solution of formaldehyde are added, and the mixture is held at about 60° C. until a clear solution forms. This solution is cooled below 30° C. and 95 grams of tetraethylene pentamine are slowly added. When the reaction subsides, 81 grams of the aqueous formaldehyde solution are added, and the reaction mixture held at 80° C. for an hour. The soft rubbery gel which forms is dried in an oven over night at 110° C. The resulting resin is then crushed, cleaned, washed with water, and dried at 60 to 70° C.

To prepare a cation-exchange resin of the hydroxy phenol:formaldehyde type, there is added 100 ml. of formalin, 30 ml. of concentrated hydrochloric acid to a boiling solution of the particular phenol (about 50 grams of pyrocatechol or a tannin) dissolved in a liter of water. Heating is continued until the resin is completely precipitated as a gel after which it is dried at 110° C. The resulting resin is then crushed, cleaned, washed with water and dried at 50° C.

For the purposes of this invention, the synthetic organic ion-exchange resins were incorporated into the following rubber compositions, in which the parts are by weight.

A. C. S. test recipe

| | Parts |
|---|---|
| Rubber (natural) | 100 |
| Sulfur | 3.5 |
| Zinc oxide | 6.0 |
| Mercapto benzothiazole | 0.5 |
| Stearic acid | 0.5 |

Tread stock recipe

| | Parts |
|---|---|
| Butadiene-styrene polymer | 100 |
| Stearic acid | 2.5 |
| Zinc oxide | 2.5 |
| Carbon black | 50 |
| Sulfur | 1.75 |
| Benzothiazyl-2-monocyclohexyl sulfenamide | 1.2 |
| Pine tar oil | 4.0 |
| Coal tar oil softener (Bardol) | 3.0 |

As an example of the effect of these ion-exchange resins in controlling the rate of vulcanization of a rubber, a synthetic organic anion-exchange resin sold under the trade name of Amberlite IR-4, a polyphenol alkane:formaldehyde:alkylene polyamine resin, which is used as an agent to remove undesirable acidic constituents from water, sugar solutions, etc., is incorporated as the ion-exchange resin in the above recipes. The results can be more clearly shown by graphical representation as in Figures 1, 2 and 3 of the accompanying drawing.

In Figure 1 is shown the vulcanization characteristics of eleven lots of butadiene-styrene copolymer (GR-S) made according to the same recipes, each in a different unit of the synthetic rubber manufacturing facilities. The copolymer was first compounded as a tread stock using the above recipe without the synthetic organic ion-exchange resin and vulcanized at 280° F. for times varying from 30 to 75 minutes. In Figure 1, the indices of vulcanization, the ratio of the tensile strength for a 30 minute vulcanizate as compared to that of the 75 minute vulcanizate is shown for each of the eleven lots of copolymer. These points are connected to emphasize the variance in the vulcanization characteristics from lot to lot. Although these lots are from different sources, different lots of synthetic rubber from the same source have been found to have vulcanization characteristics as non-uniform as is shown in Figure 1. Figure 1 also shows the leveling effect of a synthetic organic anion-exchange resin. When 4.0 parts of Amberlite IR-4 (about 325 mesh) were incorporated into the same rubber composition, and the composition vulcanized at 280° F. for the same times as before, the vulcanization characteristics of the eleven lots were substantially the same.

Figure 2 shows the effect of water on the rate of vulcanization of a rubber compounded according to the above tread stock recipe but without the synthetic organic ion-exchange resin. This shows graphically what has already been said concerning the accelerating effect of the moisture content of the rubber composition. Figure 2 also shows the leveling effect of 4.0 parts by weight of Amberlite IR-4 (about 325 mesh) on the vulcanization characteristics in the presence of the same amount of water.

The most marked effect on the properties of a rubber vulcanizate is shown in Figure 3. Alum coagulated Hevea rubber is compounded according to the above A. C. S. test recipe and vulcanized at 260° F. for various times from 20 to 120 minutes. The ultimate tensile strength of the vulcanizates is shown in Figure 3. The properties of the vulcanizates are very poor, which is a recognized fact in the rubber industry. The alum coagulation method is not regarded as permissible for the production of natural crude rubber, for this method produces a rubber whose vulcanizate possesses physical properties which are so poor as to make the crude rubber obtained by alum coagulation undesirable for use in the rubber industry. Also, in Figure 3 is shown the tensile strength for various times of vulcanization for the same rubber composition but with 4.0 parts of Amberlite IR-4 added (about 325 mesh). The tensile strength of the vulcanizates produced from this poor grade of rubber according to my invention are 500 to 800 lbs. higher than those of No. 1 Ribbed Smoked Sheet or No. 1 Thin Pale Latex Crepe compounded according to the same recipe without the ion-exchange resin and vulcanized for the same periods of time at 260° F.

The use of these synthetic organic ion-exchange resins in the vulcanization of a rubber will not only eliminate the expensive sorting, storing and blending of various lots and batches of rubber, but will also make possible the reduction of the time of vulcanization to about one half of that of the present vulcanization procedures without any deleterious effects on the vulcanizate.

The rubber compounder need no longer be concerned with the varying moisture content of the crude rubber, for the vulcanization characteristics of a rubber are now independent of the moisture content when a rubber is vulcanized in the presence of a synthetic organic ion-exchange resin according to my invention.

Wild rubbers in general have been undesirable for use in the rubber industry because of the exceedingly poor properties of their vulcanizates. As an example, when Castilloa Rubber is compounded according to the above A. C. S. test recipe and vulcanized for as long as 120 minutes at 260° F., the vulcanizate has a tensile strength so low that it cannot be measured. If put on a compounding roll mill, the rubber composition that should have been vulcanized, will sheet out like unvulcanized rubber. But, when 4.0 parts of Amberlite IR-4 are incorporated into the above Castilloa Rubber composition and vulcanized for as little as 30 minutes at 260° F., the vulcanizate has a tensile strength of 2500 lb./sq. in. or above. Thus, by my invention a relatively useless crude rubber becomes an exceedingly useful raw material.

In the above examples Amberlite IR-4 has been used merely to illustrate the effect of the synthetic anion-exchange resins. When the anion-exchange resin of the polyphenol-alkane:formaldehyde:alkylene polyamine type whose preparation is hereinbefore given is incorporated into a rubber composition, the results are the same as shown graphically in Figures 1, 2 and 3 except that the leveling of the index of vulcanization is at 0.7 to 0.75. In fact, any of the anion-exchange resins hereinbefore enumerated will produce substantially the same results when employed in a rubber composition, such as any of the amine:formaldehyde resins, meta-phenylene diamine:formaldehyde resins, polyphenol alkane: formaldehyde:alkylene polyamine resins, dihydroxyaryl sulfide:formaldehyde:alkylene polyamine resins, the meta-phenylene diamine resins activated or modified by the addition of alkyl groups to form quaternary ammonium bases, by co-condensation with polyamines or polyimines and formaldehyde, by treating with cyanamide or dicyandiamide to introduce the strongly basic guanidino group, or to substitute aliphatic polyamines for aromatic polyamines in whole or in part and condense the aliphatic polyamines with polyhalogen hydrocarbon derivatives; as well as other anion-exchange resins of the Amberlite series such as Amberlite IR-3 resin.

The various anion-exchange resins produce results varying in degree only which is a measure the efficiency of the resin as determined by the index of vulcanization at varying conditions of vulcanization.

The cation-exchange resins produce the same leveling effect only at an index of vulcanization of 0.1 to 0.4. Thus, when 4.0 parts of quebracho tannin:formaldehyde resin is incorporated into rubber compositions whose vulcanization characteristics vary as those of the untreated rubbers in Figure 1, the leveling out of the index of vulcanization would take place at about 0.1 to 0.2. Other cation-exchange resins such as catechol: formaldehyde resins, resorcinol:formaldehyde resins, pyrogallol:formaldehyde resins, quinol: formaldehyde resins, phloroglucinol:formaldehyde resins, all tannin:formaldehyde resins from such tannins as Indian Acacia, cutch tannin, etc., resins produced by the condensation of formaldehyde and sulfonic acids of aro-hydroxy compounds, and the like, when incorporated into rubber compositions will produce substantially the same results.

A mixture of a cation-exchange resin and an anion-exchange resin will lower the index of vulcanization which will slow or retard the vulcanization to a rate which is best suited for the product or process. Thus, according to my invention not only can the vulcanization of various lots and types of rubber be made uniform without regard to moisture content source of supply or individual lot but also the vulcanization rate may be controlled to any predetermined value and be reproduced with certainty by properly varying the ratio of anion-exchange resin to cation-exchange resin incorporated in the rubber composition.

The synthetic resins herein employed cannot be regarded as replacements for compounding ingredients ordinarily employed. When Amberlite IR-4 is substituted for mercaptobenzothiazole, which is used as a vulcanization accelerator in the A. C. S. test recipe, there is no acceleration of the vulcanization process when the composition is vulcanized. The accelerators, activators and vulcanizing agents ordinarily used during vulcanization should be present in addition to the synthetic organic ion-exchange resin if the best results are to be obtained.

My invention is not limited in its effectiveness to the above rubber compositions, for these synthetic organic ion-exchange resins will produce substantially the same results in any rubber compounding recipe. The above recipes are given merely as illustrations of composition which can be used.

While I have herein disclosed certain preferred manners of performing my invention, I do not thereby desire or intend to limit myself solely thereto, for as hitherto stated, the precise proportions of the materials utilized may be varied and materials having equivalent chemical properties may be employed, if desired, without departing from the spirit and scope of the invention as defined in the appended claims.

I claim:

1. The method of equalizing the vulcanization characteristics of a plurality of batches or lots of a solid rubbery material having varying vulcanization characteristics, said solid rubbery material being selected from the class consisting of rubbery copolymers of butadiene-1,3 and styrene and natural crude rubber, which comprises homogeneously dispersing throughout each batch or lot of said solid rubbery material compounding ingredients including sulfur, a vulcanization accelerator and 0.1% to 5% by weight based on the solid rubbery material of a nitrogenous resinous reaction product of a polyphenol alkane, formaldehyde and an alkylene polyamine, said reaction product being substantially insoluble in water and aqueous acidic solutions, and then heating each compounded batch or lot until vulcanized, whereby vulcanizates of substantially uniform characteristics are secured.

2. The method of claim 1 wherein the nitrogenous resinous reaction product is the product of the reaction of bis-parahydroxyphenyl dimethyl methane, formaldehyde and tetraethylene pentamine.

3. The method of claim 2 wherein the solid rubbery material is natural crude rubber.

4. The method of claim 2 wherein the solid rubbery material is a rubbery copolymer of butadiene-1,3 and styrene.

STEPHEN T. SEMEGEN.

REFERENCES CITED

The following references are of record in the file of this patent:

UNITED STATES PATENTS

| Number | Name | Date |
|---|---|---|
| 2,211,960 | Meigs | Aug. 20, 1940 |
| 2,224,679 | Hershberger | Dec. 10, 1940 |
| 2,285,750 | Swain | June 9, 1942 |
| 2,345,597 | Harmon | Apr. 4, 1944 |
| 2,394,375 | Gross | Feb. 5, 1946 |

FOREIGN PATENTS

| Number | Country | Date |
|---|---|---|
| 118,980 | Australia | Sept. 18, 1944 |
| 542,331 | Great Britain | Jan. 5, 1942 |